G. H. PETRI.
DOUGH SHAPING IMPLEMENT.
APPLICATION FILED JUNE 5, 1908. RENEWED AUG. 15, 1910.

978,482.

Patented Dec. 13, 1910.

WITNESSES
J. T. Brennan
A. T. Palmer

INVENTOR
GUNTHER H. PETRI
BY HIS ATTORNEYS
Mitchell Chadwick & Kent

UNITED STATES PATENT OFFICE.

GUNTHER H. PETRI, OF BOSTON, MASSACHUSETTS.

DOUGH-SHAPING IMPLEMENT.

978,482.  Specification of Letters Patent.  Patented Dec. 13, 1910.

Application filed June 5, 1908, Serial No. 436,799. Renewed August 15, 1910. Serial No. 577,259.

*To all whom it may concern:*

Be it known that I, GUNTHER H. PETRI, a citizen of the United States, and a resident of Boston, in the county of Suffolk and State of Massachusetts, have invented certain new and useful Improvements in Dough-Shaping Implements, of which the following is a specification.

This invention relates to implements for shaping dough into form for baking.

More particularly it relates to implements for forming rolls known as Kaiser rolls, which are circular in general form and are divided into sections, usually five in number, radiating from a depressed center. Such rolls have hitherto been molded only by hand, as far as I am aware, and the process of molding has involved the formation of each of the sections separately and in succession one after the other. The workman, starting with a somewhat flat sheet of dough works up a portion into the desired form, then rotates the sheet and works up the next portion, folding it so that it somewhat overlaps the first, and thus continues with successive portions until the last around the circle, which is lapped over the one next previously formed and is tucked under that which was first formed. The whole effect is somewhat that of a rosette.

The object of the present invention is to provide apparatus which by this lengthy shaping operation may be eliminated, and incidentally to make a great saving in time and therefore in expense of manufacture, and also to improve the process in its sanitary aspect.

Figure 1:
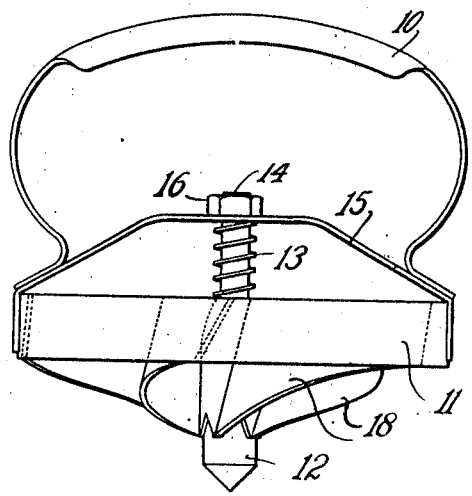
Figure 2:
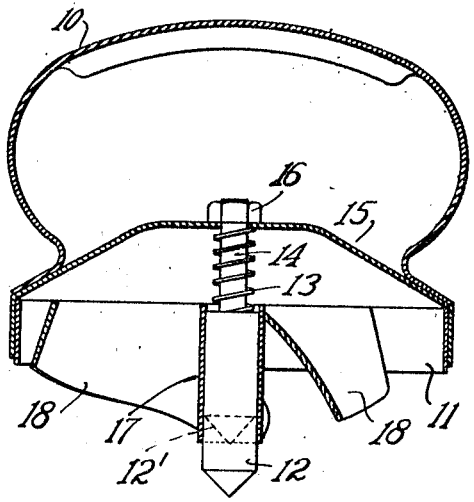
Figure 3:
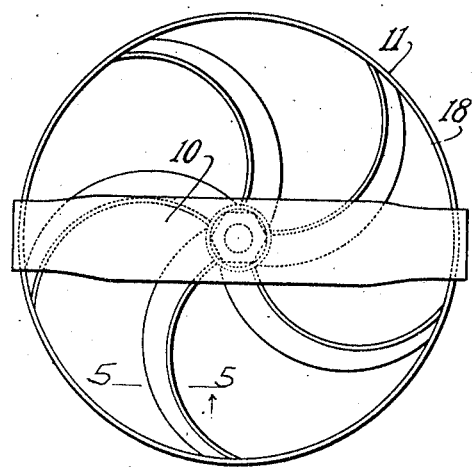
Figure 4:
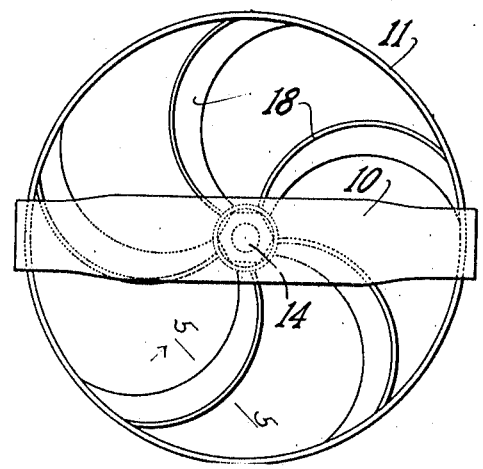

The objects of the invention are accomplished by the apparatus hereinafter described, and illustrated in the accompanying drawings, in which, Figure 1, is a side elevation of apparatus embodying the invention; Fig. 2, is the same in section through the center; Fig. 3, is the same in plan; Fig. 4, is a plan of a similar implement in which the curvature of the blades is in opposite direction, and Fig. 5, indicates inclination of the blades of Figs. 1, 2 and 3.

Figure 5:
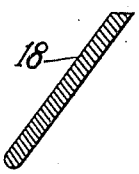

Referring to the drawings: The implement is provided with a handle 10, and preferably has a circular outside ring 11. Centrally there is a pin 12 which a spring 13 presses yieldingly downward. The haft 14 of this pin projects upward through a strap 15 attached to the handle. By adjusting a nut 16 the pin may be released or lowered or the tension of the spring adjusted as desired. A sheath 17 serves as a guide in which the pin may travel up and down. Blades 18, shaped in any desired curve, extend outward from the sheath and are attached to the outer ring 11, being thus held firm. These blades are inclined substantially as represented in Fig. 5, so that the lower edge will be in advance when the implement is used with the twisting motion hereinafter described. The forms here shown are designed to be used with a rotation like the hands of a clock, accompanied with a downward pressure. The portions of the blades which are nearest the center project lower than the portions nearest the circumference, shown clearly in Fig. 1; and hence they lead the outer portions during the downward movement of the implement when in use.

In operation, the workman, placing the implement over a mass of dough of suitable size, pushes it downward with the mass, at the same time giving a twist about the vertical axis. The pin 12 depresses and displaces the center of the mass until it meets sufficient resistance from the dough or the table under it to cause spring 13 to yield, after which the pin as the downward movement of the implement continues, rises in its sheath. It may rise until it reaches the level of the bottom of the sheath where its position is indicated by dotted line 12' in Fig. 2. As the downward movement progresses, the remaining parts of the implement enter the dough and sharply depress its skin inward in a slanting direction, or cut it somewhat on lines which are curved according to the curvature of the blades 18. Owing to the shape of those blades, this cut or depression is deepest near the center; and it is least, or ceases altogether, at the circumference. The implement is then extracted with a reverse movement and the mass of dough has been formed ready for baking as a Kaiser roll. At the very center of the mass, where the pin 12 has been, a deep depression remains, from which deep creases or cuts extend outward on curved lines toward the circumference, becoming gradually less in depth. The central depression never becomes a complete perforation through the mass of dough, because the pin yields upward before it has pierced the mass. The sheath of the pin may be recessed vertically at its bottom edge between the edges of blades 18; and the bottom of the pin 12 is pointed. Therefore, the workman may press the device down until the point of pin 12 actually penetrates the dough to the board underneath; and he may continue pressing it down till the pin has risen in its sheath so that the bottom of the sheath has also penetrated to the board underneath. Notwithstanding this, there will still exist connecting portions of dough within the sheath, under the pin, which are not severed from the mass outside the sheath; and these have the effect of maintaining a substantially imperforate center for the mass.

The edges of blades 18 are preferably round or dull so that they carry the skin of the dough inward with them instead of cutting at first impression; and this is particularly true near the circumference where a depression is desired rather than a cut. The central yielding pin, which is the first part of the apparatus to enter the mass, has the effect of shaping the central portion of the mass; after which the central ends of the blades enter. It is very desirable that the shaping should be accomplished before the cutting by these blades begins; and after that the yielding of the pin prevents the cutting which they do from causing a complete separation of any portion of the mass.

Obviously the blades may be formed in any shape other than those shown here, as desired. In Figs. 1, 2 and 3, they are convex forward; in Fig. 4, they are concave. By the workman giving more or less twist in proportion to the downward movement, the several lobes or sections into which the dough is thus formed may be more or less opened with respect to each other. While this apparatus is shown in form suitable for use by hand, it is obvious that it may also be operated by machine.

In the claims the word "radiating" is used in its broader sense, referring to blades which emanate or proceed outward from the central part of the implement on lines of any sort, curved as well as straight. The word "slanting" of the blades refers to their being set at an angle with respect to the planes passing through the axis of the central pin.

I claim:—

1. An implement of the class described, having a central pin and radiating blades, the pin projecting below the blades.

2. An implement of the class described, having a central pin and radiating blades, the pin projecting below the blades, and the parts of blades near the pin projecting lower than the extremities of the blades.

3. An implement of the class described, having a central pin and radiating slanting blades, the pin projecting below the blades.

4. An implement of the class described, having a central pin and radiating blades, the pin projecting yieldingly below the blades.

5. An implement of the class described, having a central pin and radiating blades, the pin projecting yieldingly below the blades, and the parts of blades near the pin projecting lower than the extremities of the blades.

6. An implement of the class described, having a central pin and radiating slanting blades, the pin projecting yieldingly below the blades.

7. An implement of the class described, having a central pin and radiating slanting blades, the pin projecting yieldingly below the blades, and the parts of blades near the pin projecting lower than the extremities of the blades.

8. An implement of the class described, having a central pin and radiating blades, the pin projecting yieldingly below the blades, there being a rigid part adapted to engage the board supporting the dough and to stop penetration of the pin through the mass of dough.

9. An implement of the class described, having a central pin and radiating blades, the pin projecting yieldingly below the blades, the pin being pointed and there being a sheath surrounding it, below which the point projects.

10. An implement of the class described, having a central pin and radiating blades, the pin projecting below the blades, there being a support over the blades, from which the pin depends and a spring depressing the pin therefrom yieldingly.

11. An implement of the class described, having a central pin and radiating blades, the pin projecting below the blades, the part thus projecting being pointed.

12. An implement of the class described, having a central pin and radiating slanting blades, the pin projecting yieldingly below the blades, the part thus projecting being pointed.

13. An implement of the class described, having a central pin and radiating blades, the pin projecting yieldingly below the blades, and the parts of blades near the pin projecting lower than the extremities of the blades, and the projecting part of the pin being pointed.

14. An implement of the class described, having a central pin and blades radiating therefrom in curved lines, the blades having dull edges and being set aslant, and the projecting part of the pin being pointed.

In testimony whereof I hereto affix my signature, in presence of two witnesses.

GUNTHER H. PETRI.

Witnesses:
JOSEPH T. BRENNAN,
EVERETT E. KENT.